United States Patent
Schinner (10) Patent No.: US 6,374,054 B1
(45) Date of Patent: Apr. 16, 2002

(54) DIGITAL CAMERA VIEWFINDER AND METHOD OF USING SAME

(75) Inventor: Charles E. Schinner, San Diego, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/703,387

(22) Filed: Oct. 31, 2000

(51) Int. Cl.[7] .................. G03B 17/18; G03B 17/00; G03B 17/20; H04N 5/222

(52) U.S. Cl. .................. 396/282; 396/51; 396/374; 396/296; 348/333.01

(58) Field of Search .................. 396/281, 282, 396/429, 51, 374, 296; 358/906, 909.1; 348/333.01, 333.11, 333.12, 376

(56) References Cited

U.S. PATENT DOCUMENTS

| 4,006,485 A | * | 2/1977 | Yaminishi et al. | .......... 396/282 |
| 6,091,450 A | * | 7/2000 | Hirasawa | ............... 348/333.01 |

* cited by examiner

Primary Examiner—David M. Gray
Assistant Examiner—Rochelle Blackman
(74) Attorney, Agent, or Firm—Jerry R. Potts

(57) ABSTRACT

A digital camera includes a viewfinder having a proximity sensor which is activated whenever a user looks through the viewfinder in preparation of viewing an object or framed scene. An illuminated status indicator mounted for viewing within the viewfinder for providing the user when camera status information is coupled to the proximity sensor through a microprocessor that controls the illumination level of the status indicator. The illumination level of the status indicator is controlled by the microprocessor in response to an auto-exposure algorithm that measures the brightness level of the object or framed scene that is being viewed by the user through the viewfinder.

25 Claims, 7 Drawing Sheets

DIGITAL CAMERA VIEWFINDER AND METHOD OF USING SAME

TECHNICAL FIELD

The present invention relates to digital camera viewfinders and more particularly relates to a method of using a digital camera viewfinder to determine camera status indications in a variety of lighting conditions.

BACKGROUND ART

In modern day digital cameras, the viewing of the scene that will be captured is accomplished with either an optical viewfinder or a liquid crystal display (LCD) unit either alone or in combination with an optical viewfinder. In many cases, a light emitting device with a fixed intensity, is placed near the viewfinder eyepiece in order to provide the user of the camera with an indication of the status of the camera. In this regard, the light emitting device provides for example, indications such as "the camera is ready to take a picture", "wait for the strobe to recharge", "low battery warning" and "waiting for the picture to process". In short then, such status indicator provide valuable information to the user of a camera to facilitate not only ease of use but also proper use of the camera.

While such status indicators help facilitate the ease of camera use, in many situations such indicators, depending upon ambient lighting conditions, are either too bright, making the scene viewed through the viewfinder difficult to see, or too dim, making it difficult for the user to determine camera status.

Therefore, it would be highly desirable to have a digital camera with a new and improved viewfinder status indicator that facilitates ease of camera use along with providing clearly readable status indications in a wide range of lighting conditions from poorly illuminated indoor settings to brightly illuminated outdoor settings.

SUMMARY OF THE INVENTION

A digital camera includes a viewfinder having a proximity sensor which is activated whenever a user looks through the viewfinder in preparation of viewing an object or framed scene. An illuminated status indicator mounted for viewing within the viewfinder for providing the user with camera status information is coupled to the proximity sensor through a microprocessor that controls the illumination level of the status indicator. The illumination level of the status indicator is controlled by the microprocessor in response to an auto-exposure algorithm that measures the brightness level of the object or framed scene that is being viewed by the user through the viewfinder.

BRIEF DESCRIPTION OF THE DRAWINGS

The above mentioned features of the present invention and the manner of attaining them will become apparent and the invention itself will be best understood by reference to the following description of the preferred embodiment of the invention, in conjunction with the accompanying drawings, wherein.

DETAILED DESCRIPTION OF THE PREFERRED EMBODIMENT

Figure 1:
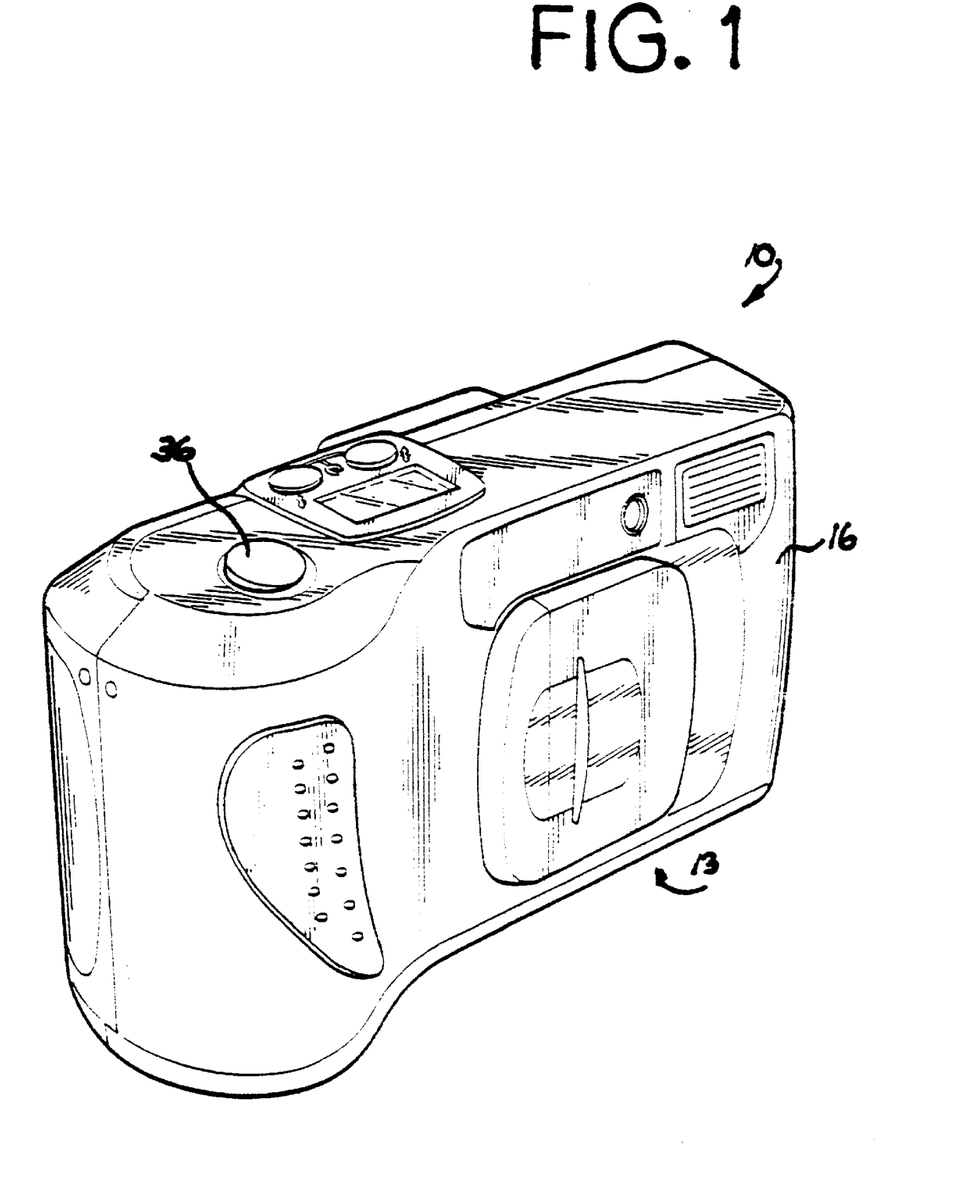
FIG. 1 is a pictorial view of a digital camera which is constructed in accordance with the preferred embodiment of the present invention.
Figure 2:
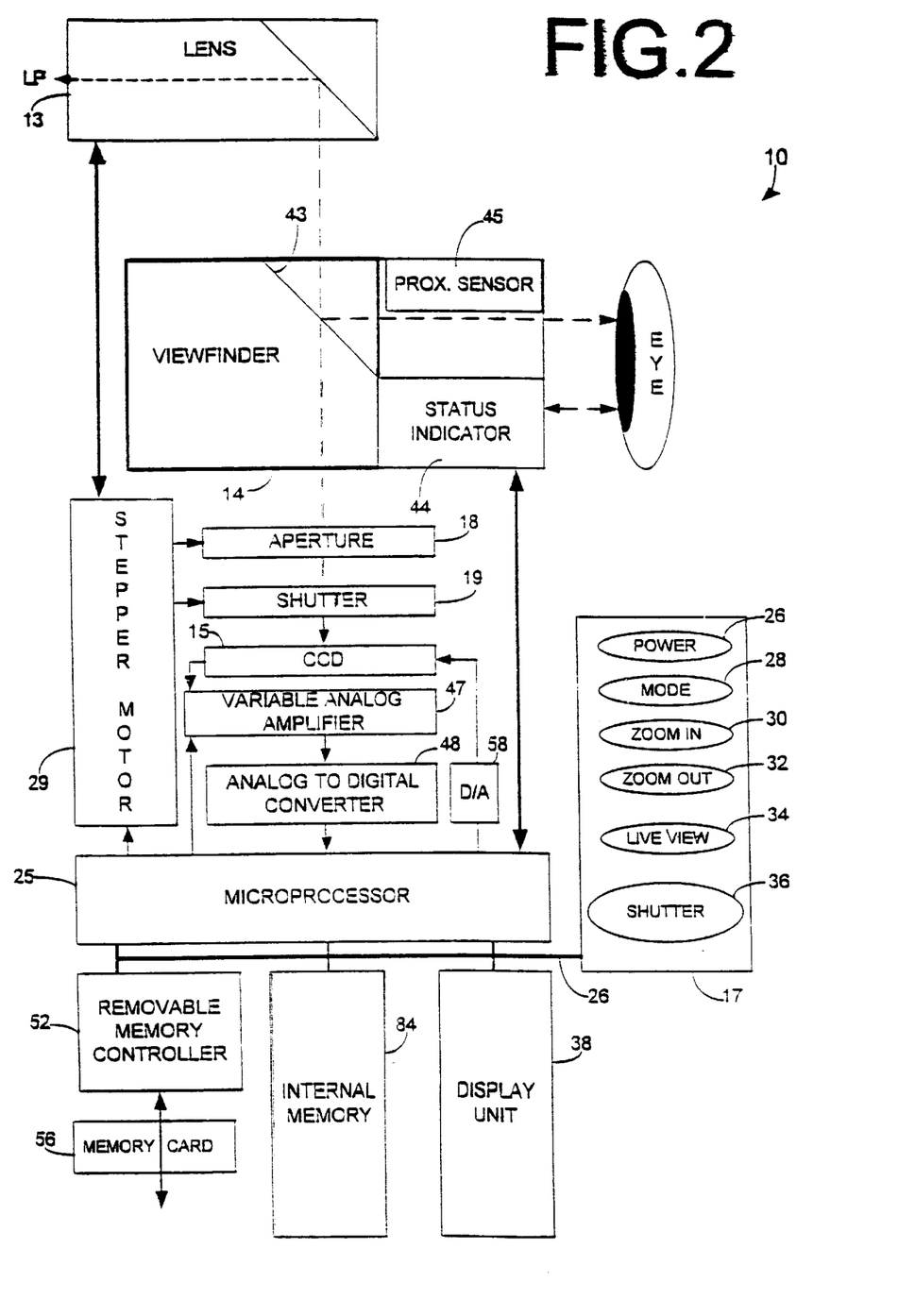
FIG. 2 is a block diagrammatic representation of the digital camera of FIG. 1.

Referring now to the drawings and more particularly to FIGS. 1–2 thereof there is shown a digital camera 10 which is constructed in accordance with the present invention. The digital camera 10 is a portable device that operates in a variety of lighting conditions ranging from poorly illuminated indoors lighting situations to brightly illuminated outdoors lighting situations.

Considering the camera 10 in greater detail with reference to FIGS. 1–2, the camera 10 generally includes a housing 16 having mounted therein a lens system or arrangement 13 that helps facilitate directing the light reflecting from an object to be captured to the photosensitive plane of the camera 10. In order to help a user frame the object to be captured, the camera 10 also includes an optical viewfinder 14 that enables a user to visualize a through the lens scene.

The optical viewfinder 14 includes a dichroic mirror 43, a status indicator 44 and a proximity sensor 45. The proximity sensor 45 generates a presence signal whenever the eye of the user is brought into close contact with the viewfinder 14. In this regard, the proximity sensor 45 functions to determine the viewing orientation of the user (the eye of the user is using the viewfinder 14, or the eye of the user is not using the viewfinder 14). In any event, the presence signal is utilized by a status indicator control program 300 to help control the brightness level of the status indicator 44. In this regard, the status indicator 44 is brightly illuminated whenever the eye of the user is not in close proximity to the viewfinder 14 so that the status of the camera 10 can be determined at an arms length distance, and controlled illuminated when the eye of the user is in close proximity to the viewfinder. In this regard, the control program 300, as will be explained hereinafter in greater detail, determines the ambient lighting conditions and based on the determined ambient lighting conditions the program 300 controls or adjusts the illumination level of the status indicator 44 to allow easy viewing of the framed object image as well as the status indicator messages.

In order to help limit the amount of light that is communicated to the photosensitive plane of the camera, the camera 10 further includes an aperture 18 that is automatically adjusted by a microprocessor 25 via a stepper motor 29. In this regard, the stepper motor 29 is coupled electrically to the microprocessor 25 and coupled mechanically to the aperture 18 in order to facilitate receiving the proper amount of light to assure proper image formation.

As best seen in FIG. 2, a shutter 19 is sandwiched between the aperture 18 and the photosensitive plane of a charged couple device (CCD) 15 that converts light into an electrical signal that is indicative of the object framed within the optical viewfinder 14. The shutter 19 is also coupled to the stepper motor 19 to firther facilitate controlling the amount of light that is allowed to fall on the CCD 15 for light converting purposes. To help control the strength of the electrical signal passing from the CCD 15 to the microprocessor 25, the camera 10 further includes a gain control device, such as a variable operational amplifier 47, whose output is connected to an analog to digital converter 48. The analog to digital converter 48 converts the analog signal passing from the output of the gain control device 47 into a digital signal of an acceptable level for processing by the microprocessor 25. A digital to analog converter 58 is coupled electrically between the microprocessor 25 and the gain control 47 to enable the microprocessor 25 to control the strength of the output signal that will be converted by the analog to digital converter 48. As will be explained hereinafter in greater detail, the microprocessor 25 operates under a set of control programs that are stored in an internal memory device, such as random access memory (RAM) module 84.

The digital camera 10 further includes a memory controller 52 that operates under the control of the microprocessor 25 for facilitating the storage of each object image captured by the camera 10. In this regard, the memory controller 52 is adapted to receive a removable memory card 56, such as a flash memory card, that functions to store the object images captured by the camera 10.

In order to enable the user to visualize images in either a live view mode of operation or in a review mode of operation (relative to images previously stored on the removable memory card 56), the digital camera 10 also includes a liquid crystal display (LCD) unit 38. The LCD 38 is coupled to the microprocessor 25 via an internal bus 26 which also allows for buffering of images to the LCD 38 from a set of internal buffer registers forming part of the microprocessor 25.

The digital camera 10 further includes a user interface 17 having a set of control switches that includes a power on/off switch 26, a mode selection switch 28, a zoom in switch 30, a zoom out switch 32 a live view switch 34 and a shutter actuation switch 36. The function of each of the switches will be described hereinafter in greater detail where relative. It will suffice to state that the shutter actuation switch 36 is a two position switch, where in a first or half way actuated position the camera operates to setup certain operating conditions, and where in a second or fully actuated position, the shutter 19 opens and closes to help facilitate the capture of an object image as seen through the camera lens 13.

Figures 3, 3A:
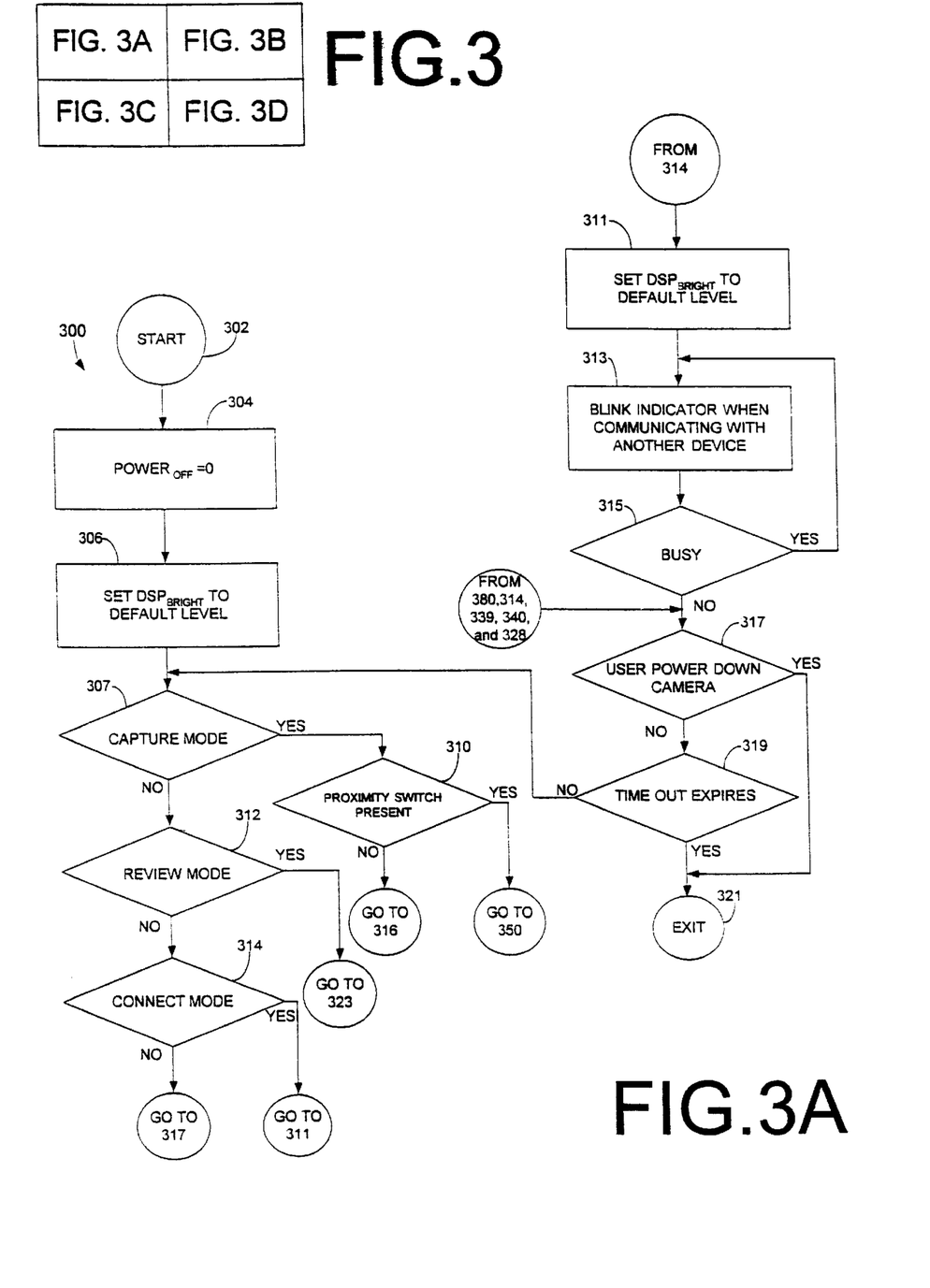
FIG. 3 is high level flowchart of a control algorithm utilized to help set the brightness level setting of a status indicator forming part of the digital camera of FIG.1.

Considering now the status indicator control program 300 in greater detail with reference to FIG. 3, the control program 300 begins at a start command 302 whenever the user actuates the power switch 26 to place the camera 10 in an active state. From the start command 302 the program proceeds to a command step 304 that resets the POWER$_{OFF}$ flag to a logical zero.

Next the program advances to a command step 306 that sets the brightness level (DSP$_{BRIGHT}$) of the status indicator 44 to a predetermined default level that permits the user to easily see the status indicator indications while holding the camera 10 at arms length.

The program then goes to a decision step 307 to determine whether the user has placed the camera 10 in a capture mode of operation via the mode switch 28. If the user has placed the camera 10 in the capture mode, the program goes to a determination step 310 to verify whether a proximity switch has been integrated within the camera 10. If a proximity switch has been integrated within the camera 10, the program advances to a determination step 350 (FIG. 3D) to determine whether the proximity switch 45 has been activated. Alternatively, if a proximity switch has not been integrated within the camera 10, the programs proceeds to a call auto exposure subroutine, such as the auto exposure subroutine described in U.S. patent application Ser. No. 09/428,877. The processes after steps 316 and 350 will be described hereinafter in greater detail.

If the user has not placed the camera 10 in the capture mode, the program proceeds from step 307 to a determination step 312 to determine whether the user has placed the camera 10 into the review mode. If the camera 10 is in the review mode the program goes to a command step 323 that will be described hereinafter in greater detail. If the camera 10 has not been placed in the review mode, the program advances to a determination step 314 to determine whether the user has placed the camera in the connect mode.

If the camera 10 is in the review mode, the program goes to the decision step 323 to determine whether the POWER$_{OFF}$ flag is set to a logical one. If this condition is true, the program advances to a command step 329 that causes the status indicator 44 to blink to indicate to the user that the camera 10 is busy. If the condition is not true the program proceeds to a command step 325 that accesses the image file header and then retrieves the EV value from the file.

It should be understood that when reviewing images in the review mode, without turning power off, the program 300 will utilize the brightness setting previously utilized during the capture of the image. This is the situation when the user is within the same lighting environment when the image was captured. When no image has been captured and the user places the camera 10 in the review mode of operation, the status indicator is set to an EV value that was established when the image was captured. This EV value is extracted or retrieved from the file header information associated with the captured image.

From step 325, the program advances to a call command 327 that calls the set status indicator brightness level subroutine 400 that will be described hereinafter in greater detail. After the subroutine 400 is executed the program returns and continues to the command step 329 to cause the status indicator 44 to blink to provide an indication to the user that the camera 10 is busy.

Next, the program goes to a command step 333 that causes the image file to be retrieved. After the image file is retrieved, the program advances to a command step 335 that causes the retrieved image file to be decompressed. The program then executes a command step 337 to cause the decompressed image to be displayed on the LCD 38. The program then goes to a command step 339 to discontinue blinking of the status indicator 44 to provide an indication to the user that the camera 10 is no longer busy. The program then returns to step 317 and proceeds as described previously.

Considering now if the camera 10 is in the connect mode, the program goes to the command step 311 that will be described hereinafter in greater detail. Otherwise, the program proceeds to a determination step 317 that will be described hereinafter in greater detail.

Considering now the command step 311 in greater detail with reference to FIG. 3A, the command step 311 causes the microprocessor 25 to set the brightness level of the status indicator 44 to a predetermined default level. Once the display brightness has been set to the default level, the program goes to a command step 313 that causes the status indicator 44 to blink when the camera 10 is communicating with another device. The program then advances to a determination step 315 to verify that the camera 10 is not busy communicating with another device. If the camera 10 is busy, the program returns to step 313 and loops between steps 313 and 315 until the communication with another device has been completed.

If the camera 10 is not communicating with another device, the program proceeds to a decision step 317 to determine whether the user has actuated the power switch 26 to power down the camera 10. If the user has actuated the power switch 26 the program advances to an exit command 321 to exit the program. Otherwise, the program goes to a decision step 319 to determine whether the camera time out period has expired. In this regard, if the user has allowed the time out period to expire (without pushing any buttons or activating any camera functions), the programs goes to the exit command 321 and proceeds as described previously. Otherwise, the program returns to the decision step 307 and proceeds as described previously.

Considering now the actions of the camera 10 after the auto exposure subroutine has been executed in response to the call command 316 (FIG. 3B), the program exits the auto exposure subroutine and proceeds to a call command 318 that calls a calculate status indicator brightness based upon a scene brightness level subroutine 400 (FIG. 4) that will be described hereinafter in greater detail. The calculate status indicator brightness subroutine causes the microprocessor 25 to calculate the display brightness based upon the scene brightness (EV) as determined by the auto exposure subroutine. After the calculate subroutine 400 has been executed, the program advances to a decision step 328 to determine whether the user has actuated the shutter button 36. If the user has not actuated the shutter button 36, the program advances to the decision step 317 and proceeds as described previously. If the user has actuated the shutter button 36, the programs goes to a command step 330 that causes the object framed within the camera lens 13 to be captured by the charged couple device 15.

Figure 3B:
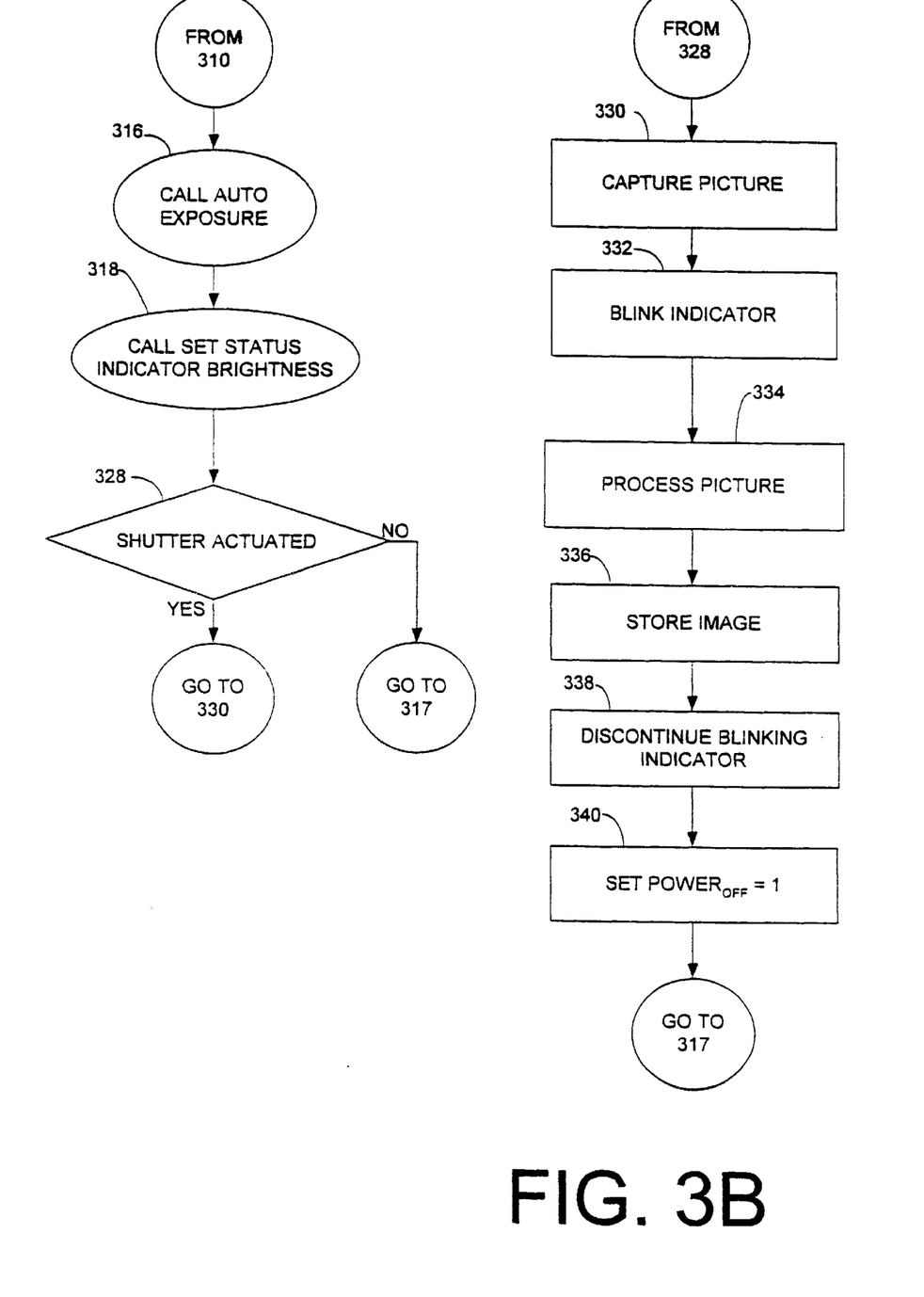

Once the object image has been captured, the program proceeds to a command step 332 that causes the status indicator 44 at the previously set brightness setting to blink in order to provide the user with an indication that an image has been captured and is being processed.

The program then advances to a command step 334 that causes the microprocessor 25 to process the captured image. Once the image has been processed, the program causes the processed image to be stored at a command step 336. To provide an indication to the user that the captured image has been processed and stored for retrieval and review, the program goes to a command step 338 that causes the status indicator 44 to discontinue blinking. Next the program goes to a command step 340 that sets the POWER$_{OFF}$ to a logical 1. From step 340 the program goes to the decision step 317 and proceeds as described previously.

Considering now the process followed by the camera 10 when a determination is made at step 310 (FIG. 3A) that a proximity switch has been integrated into the camera 10, the program, as mentioned earlier goes to a decision step 350 (FIG. 3D) to determine whether the proximity switch 45 has been activated. If the proximity switch 45 has been activated, the program goes to a call command 352 that will be described hereinafter in greater detail. If the proximity switch 45 has not been activated, the program advances to the determination step 317 and proceeds as described previously.

Figure 3C:
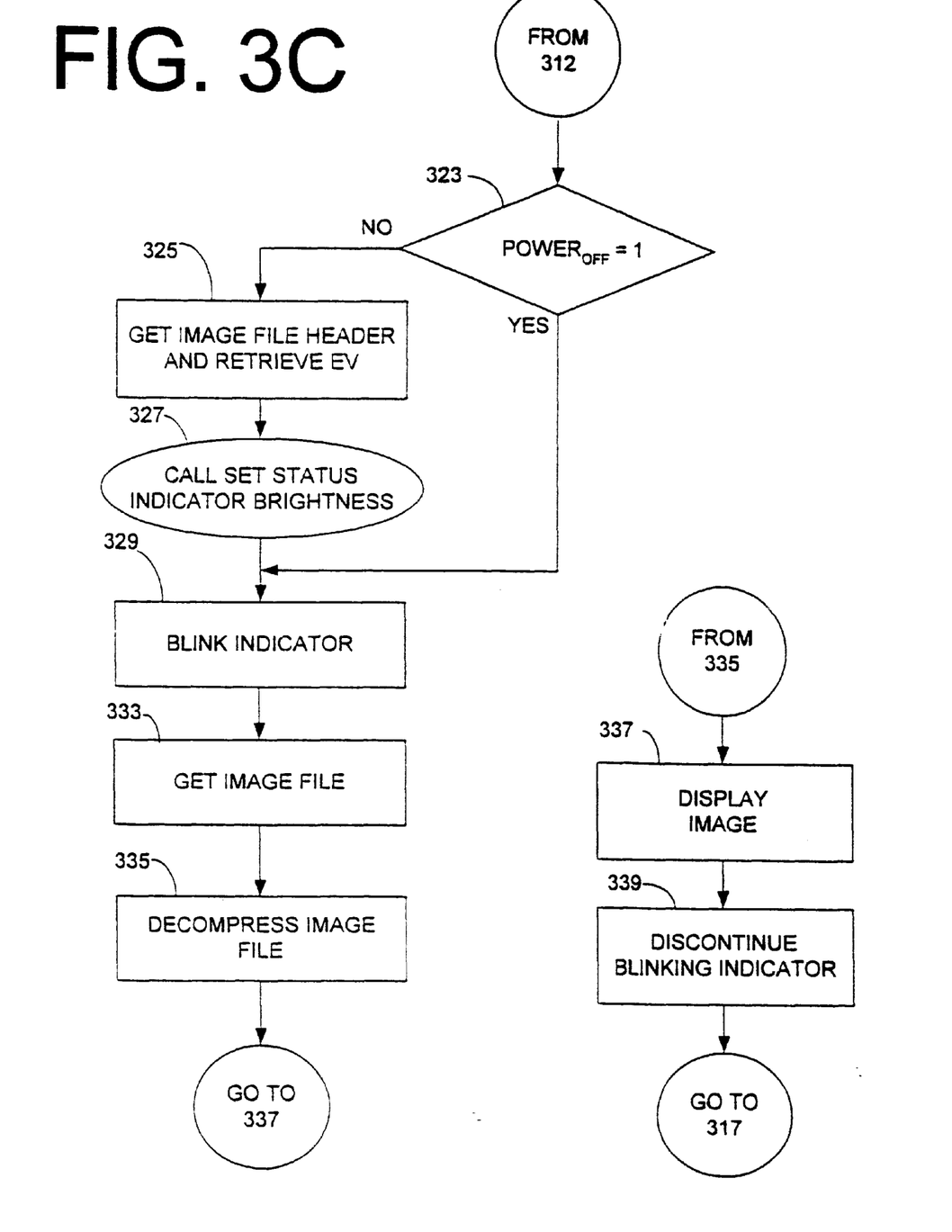
Figure 3D:
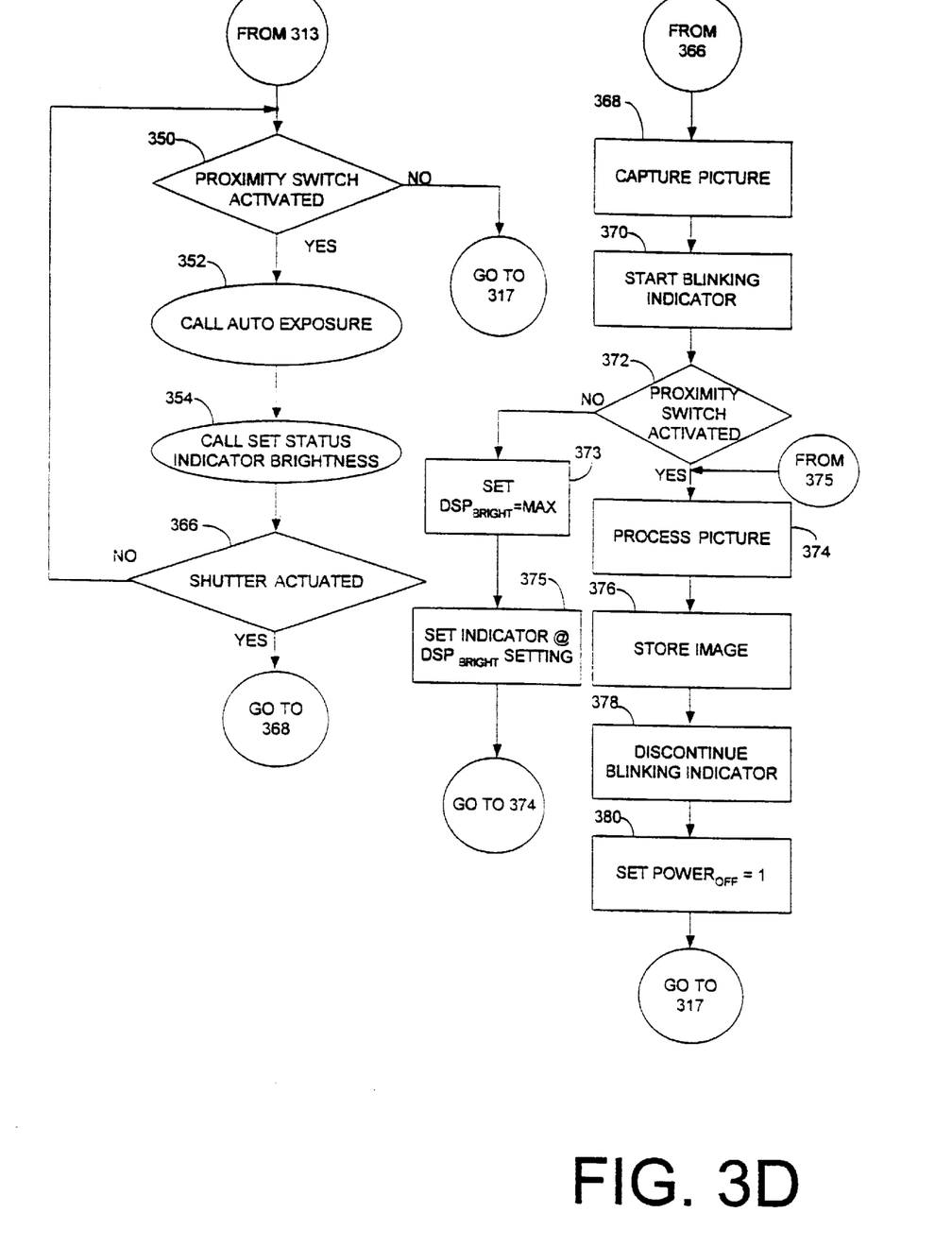

Considering now the call command 352 in greater detail with reference to FIG. 3D, the call command 352 causes the auto exposure subroutine to be executed (See previous discussion relative to the auto exposure subroutine). Once the auto exposure subroutine has been executed, the program continues to a call command 354. The call command 354 causes the microprocessor 25 to calculate the display brightness based upon the scene brightness (EV). Next the program advances to a decision command 366 to determine whether the user has activated the shutter switch 36. If the user has not activated the shutter switch 36, the program goes to the decision step 350 and proceeds as described previously. Otherwise, if the shutter switch has been activated the program advances to a command step 368 (FIG. 3D) that causes the object image framed within the camera lens 13 to be captured by the CCD 15.

From the command step 368 the program goes to a command step 370 that causes the status indicator to start blinking to give the user of the camera 10 and indication that the object image has been captured and is being processed. Next the program advances to a decision step 372 to determine whether the proximity switch 45 is still activated. In this regard, if the user is still holding his or her eye in close proximity to the viewfinder 14, the proximity switch will remain active causing the status indicator 44 to remain at the same brightness level. In this regard, if a determination is made that the proximity switch 45 is active, the program goes to a command step 374 that causes the microprocessor 25 to process the captured image.

Next, the program proceeds to a command step 376 that causes the processed image to be stored. Once the processed image has been stored on the removable memory card 56, the program goes to a command step 378 to cause the status indicator 44 to discontinue blinking to give the user an indication that the captured image has been processed and stored for subsequent retrieval and review by the user. From step 378, the program advances to a command step 380 that causes POWER$_{OFF}$ to be set to a logical one. The program then goes to the decision step 317 (FIG. 3A) and proceeds as described previously.

If at step 372 a determination is made that the proximity switch 45 is no longer active, the program goes to a command step 373 that causes the display brightness level to be set to a maximum brightness level. In this regard, if the user is holding the camera 10 at an arms length position for example, the brightness level of the status indicator 44 is increased to a maximum brightness level to make it easier for the user to visualize the status indicator 44. The program then advances to a command step 375 that causes the brightness level of the status indicator 44 to be set to the brightness level of DSP$_{BRIGHT}$. The program then goes to step 374 and proceeds as described previously.

Figure 4:
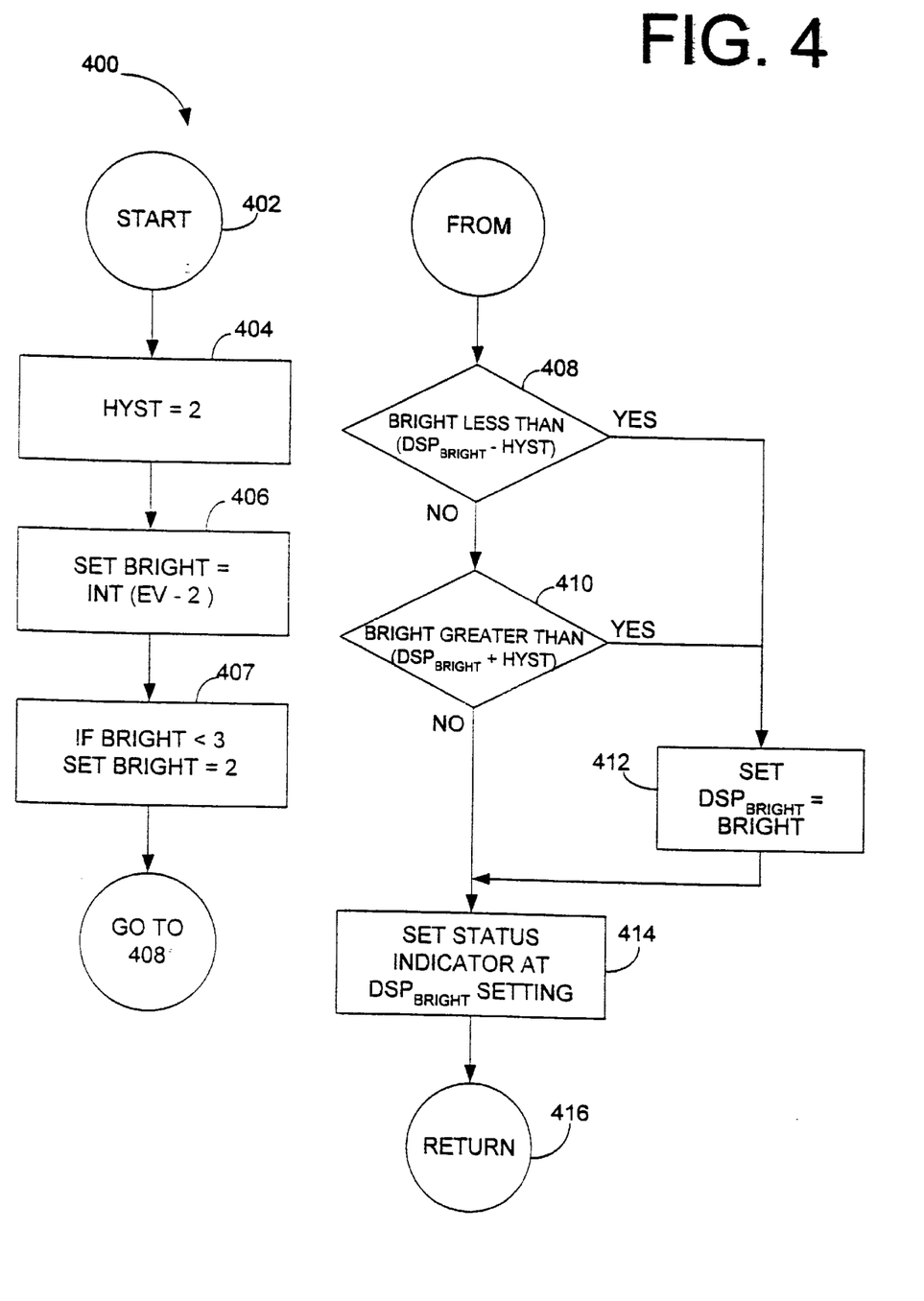
FIG. 4 is a high level flowchart of a determination algorithm to calculate the brightness level of the status indicator forming part of the digital camera of FIG. 1.

Considering now the calculate brightness subroutine 400 in greater detail with reference to FIG. 4, the calculate brightness subroutine 400 is executed in response to the call calculate brightness step 318 (FIG. 3B) or the call calculate brightness step 327 (FIG. 3C) or the call calculate brightness step 354 (FIG. 3D) whichever the case may be. After the calculate brightness subroutine 400 is executed the program returns to the next step following the call command that initiated the subroutine 400. In response to any of the above-mentioned call commands, the subroutine 400 begins by the execution of a command 402.

From the start command 400, the program proceeds to a command step 404 that set the hystersis level (HYST) to a numerical value of two. Next the program goes to a command step 406 that determines the status indicator brightness level as INT (EV −2).

The program then advances to a command step 407 that set the value of BRIGHT equal to the numerical value of two if the value of BRIGHT is less than three. Next, the program goes to a decision step 408 to determine whether the brightness level is less that DSP$_{BRIGHT}$− HYST. If this condition is true, the program goes to a command step 412 that set DSP$_{BRIGHT}$ equal to BRIGHT to prepare a new control word for setting the status indicator to a new brightness level. After executing the command step 412 the program advances to a command step 414 that sets the brightness of the status indicator to the DSP$_{BRIGHT}$ setting. It should be understood by those skilled in the art that the microprocessor 25 includes an internal pulse width modulator (not shown) that responds a pulse width modulator word based upon the EV setting, where the pulse width modulator word is generated at step 414 for controlling the brightness level of the status indicator 44. After executing the command step 414, the program proceeds to a return step 416 that returns the program to the next step following the call command that initiated the subroutine 400 as described earlier.

If at the decision step 408 a determination is made that the brightness level BRIGHT is not less that DSP$_{BRIGHT}$-Hystersis, the program goes to another decision step 410 to determine whether the brightness level BRIGHT is greater than DSP$_{BRIGHT}$+Hystersis. If this condition is true, the program goes to the command step 412 and proceeds as described previously. Otherwise the program leaves the brightness level of the status indicator 44 unchanged and advances to the command step 414 proceeding as described previously.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

I claim:

1. A digital camera, comprising:
    a through the lens viewfinder for enabling a user to directly view an object seen through a lens;
    said viewfinder having a proximity sensor for determining whenever a user looks through the viewfinder and a status indicator for providing the user with camera status information;
    and a control algorithm responsive to an indication that the user is looking through the viewfinder for controlling the illumination of said status indicator.

2. A digital camera according to claim 1, further comprising:
    an auto-exposure algorithm for measuring a brightness level of an object viewed in said viewfinder; and
    a microprocessor responsive to said auto-exposure algorithm and to said control algorithm for causing the status indicator to be set to a maximum brightness level when said proximity sensor is not generating a user detection signal and for causing the status indicator to be set to an adjusted brightness level when said proximity sensor is generating a user detection signal.

3. A digital camera, comprising:
    a proximity device for sensing a viewing orientation of a user;
    a status indicator mounted in close proximity to said proximity device for providing a user with camera status information; and
    a microprocessor responsive to said proximity device for causing said status indicator to be set to a maximum brightness when said proximity device senses a remote viewing orientation of the user.

4. A digital camera according to claim 3, further comprising:
    a viewfinder for permitting a user to frame an object while simultaneously permitting the user to view camera status information on said status indicator;
    an auto-exposure algorithm for measuring a brightness level of said object, and
    said microprocessor responsive to said auto-exposure algorithm for causing said status indicator to be set to a desired auto-exposure algorithm functionally related brightness level when said proximity device senses the user looking through said viewfinder.

5. A digital camera, comprising:
    a viewfinder for permitting a user to frame an object image as seen through a camera lens;
    a status indicator mounted within said viewfinder for providing the user with camera status information;
    a proximity device for sensing if a user is using said viewfinder;
    a microprocessor responsive to said proximity device for causing a control algorithm to be executed to control the illumination level of said status indicator; and
    said control algorithm causing said status indicator to be illuminated to no greater illumination level than a determined illumination level of said object image when said proximity device senses that the user is using said viewfinder.

6. A digital camera, according to claim 5, wherein said control algorithm further causes said status indicator to be illuminated to a maximum illumination level when said proximity device senses that the user is not in close proximity to said viewfinder.

7. A digital camera according to claim 6, wherein said control algorithm further causes said status indicator to blink on and off when said microprocessor is processing a captured image for storage on a removable storage device.

8. A digital camera according to claim 7, wherein said control algorithm further causes said status indicator to discontinue blinking when said microprocessor has caused said captured image to be stored on said removable storage device.

9. A digital camera according to claim 8, wherein said control algorithm further causes camera to power down after said captured image has been stored on said removable storage device and said proximity device senses that the user is not in close proximity to said viewfinder.

10. A digital camera according to claim 9, wherein said control algorithm causes said camera to power down after a predetermined period of time.

11. A method of using a digital camera, comprising:
    providing a proximity sensor for determining whenever a user looks through a viewfinder;
    providing a viewfinder status indicator to display camera status information whenever the user looks through said viewfinder; and
    controlling the illumination level of said status indicator in response to an indication that the user is looking through the viewfinder.

12. A method of using a digital camera according to claim 11, further comprising:
    measuring a brightness level of an object viewed in said viewfinder; and
    causing the status indicator to increase brightness when said proximity sensor is not active and for causing the status indicator to decrease brightness when said proximity sensor is active.

13. A method of using a digital camera, comprising:
    providing a viewfinder status indicator for permitting a user to frame an object image as seen through a camera lens while simultaneously providing the user with camera status information;

providing a proximity device for sensing if a user is in close proximity to said viewfinder status indicator;

responding to said proximity device for causing a control algorithm to be executed to control the illumination level of said status indicator; and causing said status indicator to be illuminated to no greater illumination level than a determined illumination level of said object image when said proximity device senses that the user is in close proximity to said viewfinder status indicator.

14. A method of using a digital camera according to claim 13, wherein said status indicator is illuminated to a maximum illumination level when said proximity device senses that the user is not in close proximity to said viewfinder status indicator.

15. A method of using a digital camera according to claim 14, wherein said status indicator blinks on and off when the camera is processing a captured image for storage on a removable storage device.

16. A method of using a digital camera according to claim 15, wherein said status indicator discontinues blinking when said captured image is stored on said removable storage device.

17. A method of using a digital camera according to claim 16, wherein the camera powers down after said captured image has been stored on said removable storage device and said proximity device senses that the user is not in close proximity to said viewfinder status indicator.

18. A digital camera, comprising:

a viewfinder for helping a user to view an object image, said viewfinder including a status indicator for providing a user with camera status information while the user views the object image;

an auto-exposure algorithm for determining a brightness level associated with the object image; and a control algorithm responsive to said auto-exposure level for adjusting the brightness level of said status indicator to an acceptable viewing level intensity corresponding functionally to a scene brightness level determined by said auto-exposure algorithm.

19. A digital camera, comprising:

a viewfinder for permitting a user to frame an object image as seen through a camera lens;

a status indicator mounted in proximity to said viewfinder for providing the user with camera status information;

a microprocessor for causing a control algorithm to be executed to control the illumination level of said status indicator; and said control algorithm causing said status indicator to be illuminated to a sufficient illumination level to be easily observed by a user but not a sufficient level to interfere with the viewing of the object when viewed in said viewfinder.

20. A method of using a digital camera, comprising:

providing a viewfinder status indicator to display camera status information whenever a user activates the camera; and controlling the illumination level of said status indicator in response to an indication that the user is activating a shutter switch for capturing an object as an image.

21. A method of controlling the illumination level of a status indicator, comprising:

setting a status indicator illumination level to a current illumination level when a user is reviewing a captured image in real time in a viewfinder; and setting said status indicator illumination level to a header file illumination level when the user is reviewing said captured image in other than real time.

22. A method of controlling the illumination level of a status indicator according to claim 21, wherein said header file illumination level is an illumination level retrieved from a stored file header associated with said captured image.

23. A method of controlling the illumination level of a status indicator according to claim 22, wherein said current illumination level corresponds functionally to an auto exposure determined scene brightness level.

24. A digital camera, comprising:

a status indicator for providing a user with camera status information;

an auto exposure algorithm for measuring a brightness level of an object image; and a microprocessor responsive to said auto exposure algorithm for causing said status indicator to be set to an adjusted brightness level to help facilitate viewing said object image in a viewfinder disposed in close proximity to said status indicator.

25. A digital camera, comprising:

a viewfinder status indicator to display camera status information whenever a user activates the camera;

a brightness adjustment algorithm for controlling the brightness level of said viewfinder status indicator to a brightness level that corresponds to a determined scene brightness level to help facilitate viewing a scene and said status indicator substantially simultaneously.

* * * * *